[19] United States Patent
Palfreyman et al.

[15] 3,645,829
[45] Feb. 29, 1972

[54] APPARATUS FOR PRODUCING A FIBER REINFORCED COMPOSITE MATERIAL

[72] Inventors: Jack Palfreyman, Tansley, near Matlock; Henry Edward Middleton, Derby, both of England

[73] Assignee: Rolls-Royce Limited, Derby, England

[22] Filed: Nov. 15, 1968

[21] Appl. No.: 776,115

[30] Foreign Application Priority Data

Dec. 5, 1967 Great Britain......................55,170/67

[52] U.S. Cl..............................156/441, 29/156.8, 244/123, 156/169, 156/446, 156/458, 156/575
[51] Int. Cl.......................................................B65h 81/08
[58] Field of Search................156/161, 169, 173, 175, 296, 156/433, 441, 446; 230/134 P; 29/156.8; 242/1.1; 244/123, 124

[56] References Cited

UNITED STATES PATENTS

| | | | |
|---|---|---|---|
| 2,978,193 | 4/1961 | Kelly | 242/1.1 A |
| 2,980,158 | 4/1961 | Meyer | 156/433 X |
| 3,057,767 | 10/1962 | Kaplan | 29/156.8 B |
| 3,205,108 | 9/1965 | Wilkins | 156/446 X |
| 3,250,602 | 5/1966 | Stalego | 156/172 X |
| 3,501,090 | 3/1970 | Stoffer et al. | 230/134 P |
| 3,333,279 | 7/1967 | Colen et al. | 156/296 X |

FOREIGN PATENTS OR APPLICATIONS

| 211,042 | 9/1960 | Austria | 285/21 |
|---|---|---|---|

Primary Examiner—Carl D. Quarforth
Assistant Examiner—E. E. Lehmann
Attorney—Cushman, Darby & Cushman

[57] ABSTRACT

The present invention relates to apparatus for producing a carbon or boron fiber reinforced composite material for use in the manufacture of blades for gas turbine engines. The apparatus consists of a number of aerofoil section formers mounted on a rotatable drum means for winding a continuous fiber or bundle of fibers under tension onto the formers, a source of curable matrix material located adjacent the drum, and means for curing the matrix material.

1 Claims, 2 Drawing Figures

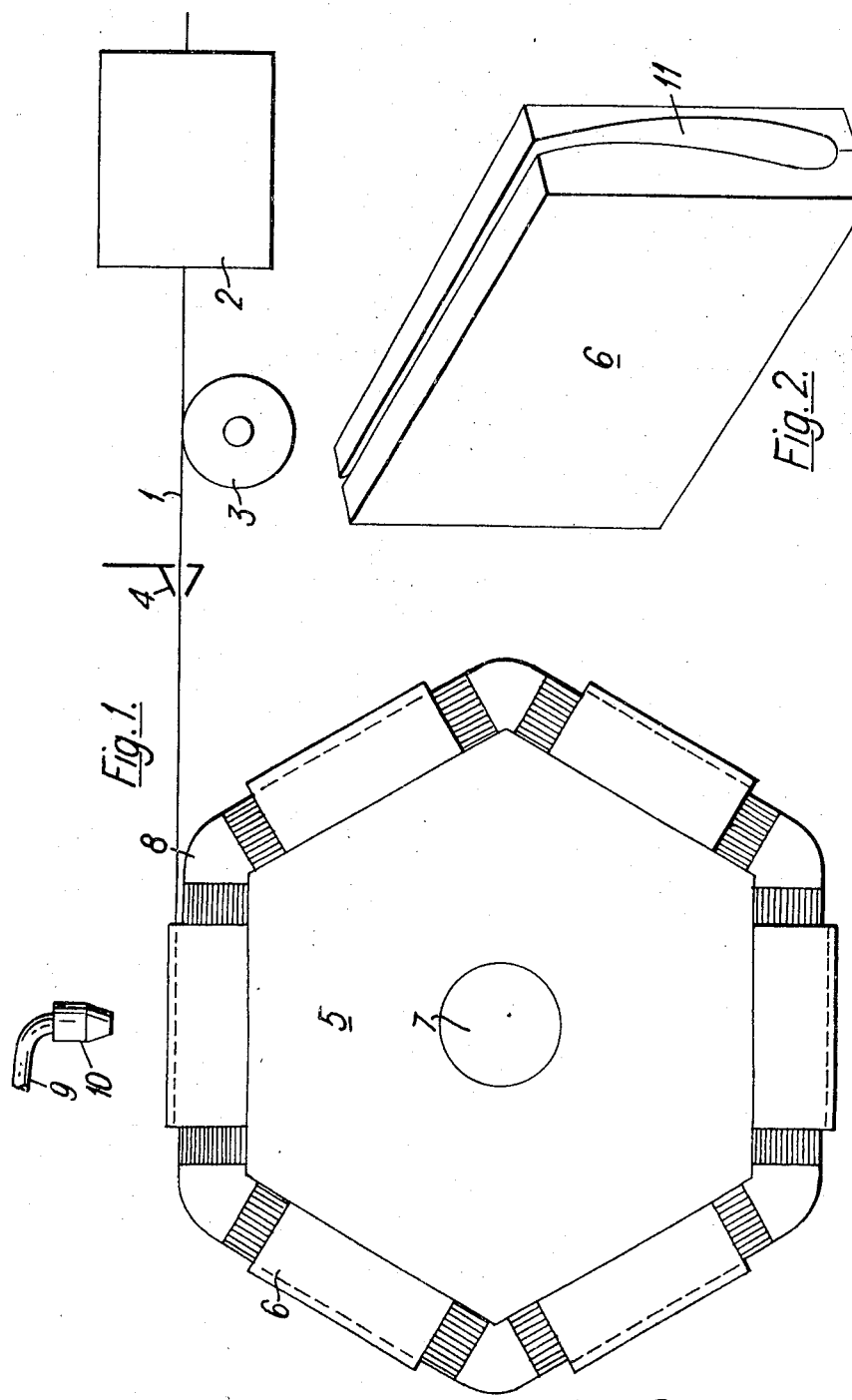

APPARATUS FOR PRODUCING A FIBER REINFORCED COMPOSITE MATERIAL

The present invention relates to apparatus for producing a fiber reinforced composite material. The invention has particular, but not exclusive, reference to carbon fiber reinforced resin materials.

According to the invention, an apparatus is provided with a plurality of formers mounted on a rotatable support for receiving a continuous fiber into mould cavities. Each former comprises a two part die whose internal surfaces define an aerofoil shape. More than one continuous fiber or filament may be used, and the fibers or filaments may be carboniferous or boron. The formers include mould cavities which are preferably aerofoil shaped so that stator vanes or rotor blades for gas turbine engines may be produced with longitudinally extending fiber reinforcements. The continuous fiber or fibers are wound under tension into the mould cavities, and means are provided for supplying a curable matrix material to the fiber as it is being wound. Additional means are provided for curing the matrix material. The fiber or fibers may be initially extracted from a heat treatment furnace before being wound onto the plurality of formers.

The apparatus may include two or more formers mounted on a rotatable support and guide means may be located between adjacent formers in order to evenly arrange the fiber or fibers. Each former may consist of a two part die whose internal surfaces define an aerofoil shape.

The fiber or fibers may pass around a tensioning drum before being wound onto the or each former.

The invention will now be described in more detail, merely by way of example, with reference to the accompanying drawings in which:

FIG. 1 is a diagrammatic representation of the layout of the apparatus required, and FIG. 2 is an enlarged view of one of the formers of FIG. 1.

Referring now to the drawings a continuous fiber 1 which may comprise a single filament or bundle of filaments is shown emerging from a furnace 2 which may be the last stage in a heat treatment process for the manufacture of the fiber. The fiber is passed over a drum 3 which acts as a tensioning device and passes through a guide 4 to a drum 5 on which are mounted a plurality of formers 6.

The drum 5 is rotated on a shaft 7 by means not shown and the fibers are orientated on the formers 6 by deflector members 8.

Means for supplying a curable resin is provided and is shown in the form of a feed tube 9 and a nozzle 10 which are disposed adjacent the former. The resin is applied to the fiber simultaneously with the winding of the fiber on to the former. As the drum 5 is rotated therefore there is a continuous build up of fibers on the formers 6 that the required shape may be made.

In the particular example shown the former comprises a die made of two halves having aerofoil shaped surfaces, the two halves being held together to form an aerofoil shaped space 11 into which the fiber is continuously wound.

The invention has a distinct advantage over previous apparatus or methods of forming aerofoil shaped blades in which sheets of resin impregnated fibers are laid one one top of the other and pressed to form the blade shape. The present invention avoids crushing of the fibers by pressing in moulds, which is a necessary step when blades are laid up from sheets, because each fiber, being wound under tension and being coated with resin, applies a small pressure to those fibers on top of which it is laid thereby spreading out the resin to form a substantially cavity free resin matrix. The invention also enables the fiber to resin ratio to be more closely controlled.

Further, the resin is applied to the fiber immediately prior to winding in either an uncured or partially cured state, and a curing furnace may be suitably positioned to one side or to the bottom of the drum which can cure the resin as the process proceeds.

The deflector members 8 are used to ensure that the fibers are laid on the former in a straight line rather than having any curvature, and therefore it may be necessary to provide some means of extracting and extending the guide members 8 as the former fills.

The aerofoil shaped member produced by the process described in the above example will have longitudinally disposed fibers and will, therefore be strong in tension and suitable for use as a rotor blade in a gas turbine engine.

It will be appreciated that by minor modifications to the deflector members 8 and to the former 6 a hollow blade may be produced. The modification to the former will comprise the insertion in the aerofoil shaped space 11 of a suitably shaped core around which the fibers will be deflected by the deflector members 8.

We claim:

1. Apparatus for producing fiber reinforced material comprising
    a plurality of formers mounted on a rotatable support, with each of said formers including a mould for receiving continuous fiber and a matrix material, and each of said formers comprising a two-part die whose internal surfaces define an aerofoil shape,
    a fiber deflecting means arranged adjacent an entrance to each of said moulds for guiding a continuous fiber into the mould,
    means for winding a continuous fiber under tension onto said plurality of formers,
    means disposed adjacent to said apparatus for simultaneously applying a curable matrix material onto the fiber as it is being wound onto said plurality of formers, and
    means for subsequently curing the matrix material.

* * * * *